March 27, 1956 R. B. NUNNALLY 2,739,406
FISH LURE
Filed Sept. 29, 1952
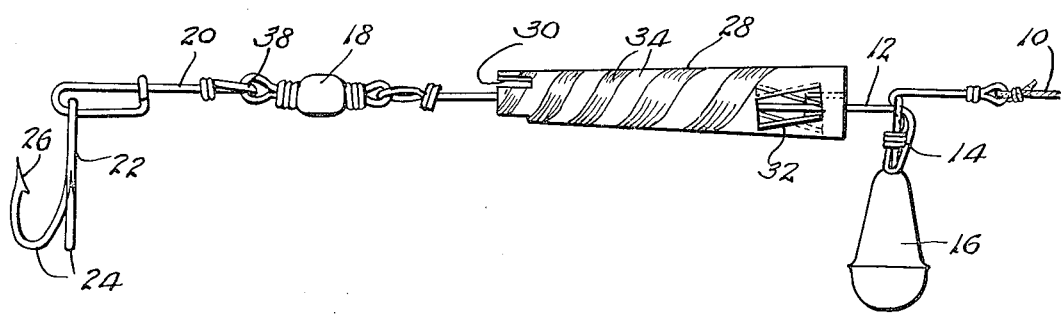
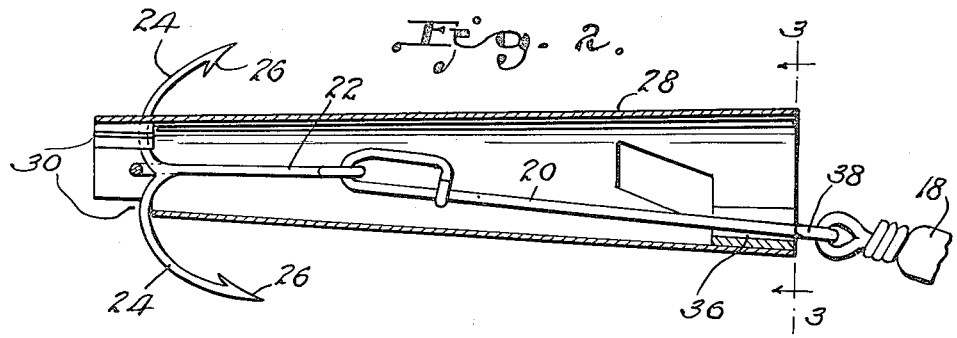
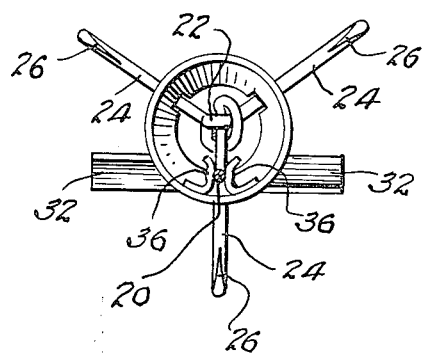
Robert B. Nunnally
INVENTOR
BY
ATTORNEYS.

United States Patent Office 2,739,406
Patented Mar. 27, 1956

2,739,406
FISH LURE

Robert Bruce Nunnally, Brownsville, Tex.

Application September 29, 1952, Serial No. 311,977

1 Claim. (Cl. 43—42.08)

This invention relates to a trolling fish lure and more particularly to a lure shield for enclosing the shank of a conventional fish hook, a snap hook by which the fish hook is connected through a conventional swivel to a conventional leader and an eccentric weight for the leader.

The primary object of the invention is to facilitate the removal of a fish from a fishing line, without the attendant danger of being snagged with a fish hook when using a lure shield.

A further object is to permit the lure to spin with the fishhook, without twisting the fishline.

The above and other objects are attained by this invention which embodies a structure that features an elongated lure shield or body having an elongated slot opening through one end thereof for receiving a prong of a conventional barbed fish hook, a snap hook removably connected to the shank of the fish hook and extending longitudinally through the lure shield, and a spring clip carried by the lure shield and extending inwardly adjacent the end nearest the fishline, to receive the snap hook and so, releasably hold the prong of the barbed hook in the slot.

Other features include vanes carried by the lure shield or body and extending outwardly therefrom for causing it to spin as the barbed hook moves through the water, and a weight carried by the leader and extending downwardly therefrom for preventing the spinning motion from being transmitted from the lure shield to the leader.

In the drawings:

Figure 1 is a side elevation of my trolling fish lure showing the fish hook ready to be disengaged from the leader, swivel, and the snap hook, Figure 2 is an enlarged sectional side elevation of the lure shield in operative position on the fish hook and, Figure 3 is a sectional view taken substantially on the line 3—3 of Figure 2.

Referring to the drawings in detail a conventional fishline 10 has connected thereto a leader 12 which is provided intermediate its ends with a loop 14 by means of which a suitable weight or sinker 16 is connected to the leader.

Carried by the leader at its other end is a conventional swivel 18, to which is attached a snap hook 20, to which a conventional barbed fish hook 22 having laterally extending prongs 24 carrying barbs 26 is latched.

An elongated tapered lure shield or body 28 is slipped onto the leader 12 with the large end toward the fishline, when the fish hook 22 is removed from the snap hook 20. This shield 28 preferably tapers throughout its length. Formed in the lure shield at the small end are radial longitudinal slots 30, Fig. 2, adapted to receive the prongs 24 of the fish hook 22 for the fishing operation. Carried by and extending outwardly from the shield 28 adjacent the larger end thereof are diagonally disposed vanes 32 which, when the leader 12 is drawn through the water by the fishing line 10, will cause the body 28 and hook 22 to rotate. The shield 28 is preferably provided on its exterior with multicolored stripes 34 for the purpose of attracting fish to the hook 22. Carried by and extending inwardly from the shield adjacent the larger end thereof is longitudinally extending spring clip 36 in which is received the shank of the hook 20 so that the eye 38 of said hook 20 which connects the snap hook to the swivel will engage the ends of the clip 36 to prevent longitudinal displacement of the hook 22 relative to the lure shield 28 when the device is in use.

In use with the parts assembled as illustrated in Figure 2, it will be evident that as the fish line 10 and leader 12 are moved through a body of water, the vanes 32 will react against the water to cause the shield or body 28, fish hook 22 and snap hook 20 to rotate on the swivel 18. Rotation of the lead 12 and the fishing line 10 will be retarded or arrested by the sinker or weight 16 so that no twisting of the fish line 10 will result. As the multicolored stripes rapidly rotate in the water, fish will be attracted to the lure and upon striking will swallow the fish hook 22 and a portion of the lure shield 28. In order to remove the fish from the fish hook, the shank of the snap hook 20 which is retained in the spring clip 36 is snapped free, out of position in the clip jaws and the lure shield 28 is slid backwardly on the leader, Figure 1, to free the fish hook and expose the snap of the snap hook 20. Then, the snap hook is released from the fish hook in the mouth of the fish. By snapping a new fish hook in place and restoring the parts to the initial position, the fish lure is ready for reuse. The hook lodged in the mouth of the fish can be extracted at leisure.

While in the foregoing there has been shown and described the preferred embodiment of this invention it is to be understood that minor changes in the details of construction, combination and arrangement of parts may be resorted to without departing from the spirit and scope of the invention as claimed.

What is claimed is:

A fish lure to be fastened to a fish line comprising a swivel, a leader wire secured at one end to said swivel and secured at the other end thereof to the fish line, a laterally extending weight secured to said leader adjacent the fish line, a snap hook secured to the other end of said swivel, a multiple fish hook secured to said snap hook, and a tubular lure body adapted to initially encompass part of said snap hook and said fish hook, said lure body at its outer end being formed with a plurality of slots through which the bills of said fish hook engage, a pair of opposed resilient clips disposed within said lure body adjacent the inner end thereof and engageable with the shank of said snap hook for releasably holding said lure body against endwise movement with said swivel projecting from the inner end of said lure body, and a pair of laterally projecting vanes secured to said lure body.

References Cited in the file of this patent

UNITED STATES PATENTS

| 218,345 | Wakaman | Aug. 5, 1879 |
| 1,050,759 | Betts et al. | Jan. 14, 1913 |
| 1,351,669 | Mansfield | Aug. 31, 1920 |
| 1,522,451 | Hayes | Jan. 6, 1925 |
| 1,831,178 | Harber | Nov. 10, 1931 |
| 2,288,009 | Matasy et al. | June 30, 1942 |
| 2,315,575 | Austad | Apr. 6, 1943 |
| 2,517,299 | Gaylord | Aug. 1, 1950 |